United States Patent

Goldthorp et al.

[15] 3,676,608

[45] July 11, 1972

[54] LINE CIRCUIT FOR A KEY TELEPHONE SYSTEM

[72] Inventors: David Clayton Goldthorp, Oley, Pa.; Albert David Limifro, Denver; John Paul Smith, Broomfield, both of Colo.

[73] Assignee: Bell Telephone Laboratories, Incorporated, Murray Hill, Berkeley Heights, N.J.

[22] Filed: Oct. 20, 1970

[21] Appl. No.: 82,272

[52] U.S. Cl. ....................179/81 R, 179/84 R, 179/99

[51] Int. Cl. ....................H04m 1/00

[58] Field of Search ....................179/81 R, 84 R, 84 A, 90 K, 179/99

[56] References Cited

UNITED STATES PATENTS

| | | | |
|---|---|---|---|
| 3,436,488 | 4/1969 | Barbato et al. | 179/84 R |
| 3,239,610 | 3/1966 | Morse et al. | 179/99 |
| 3,322,902 | 5/1967 | Carney | 179/84 R |

*Primary Examiner*—Kathleen H. Claffy

*Assistant Examiner*—William A. Helvestine

*Attorney*—R. J. Guenther and Edwin B. Cave

[57] ABSTRACT

In a key telephone system line circuit employing relays and transistor control and logic circuitry, elimination of the conventional central office ground return path is achieved by substantially isolating a bridged ringing detector relay from the logic and control elements. Breakdown voltage limitations of integrated circuitry are met by the employment of a stacking arrangement for certain of the transistors of the control circuit that are utilized to drive one of the control relays.

7 Claims, 1 Drawing Figure

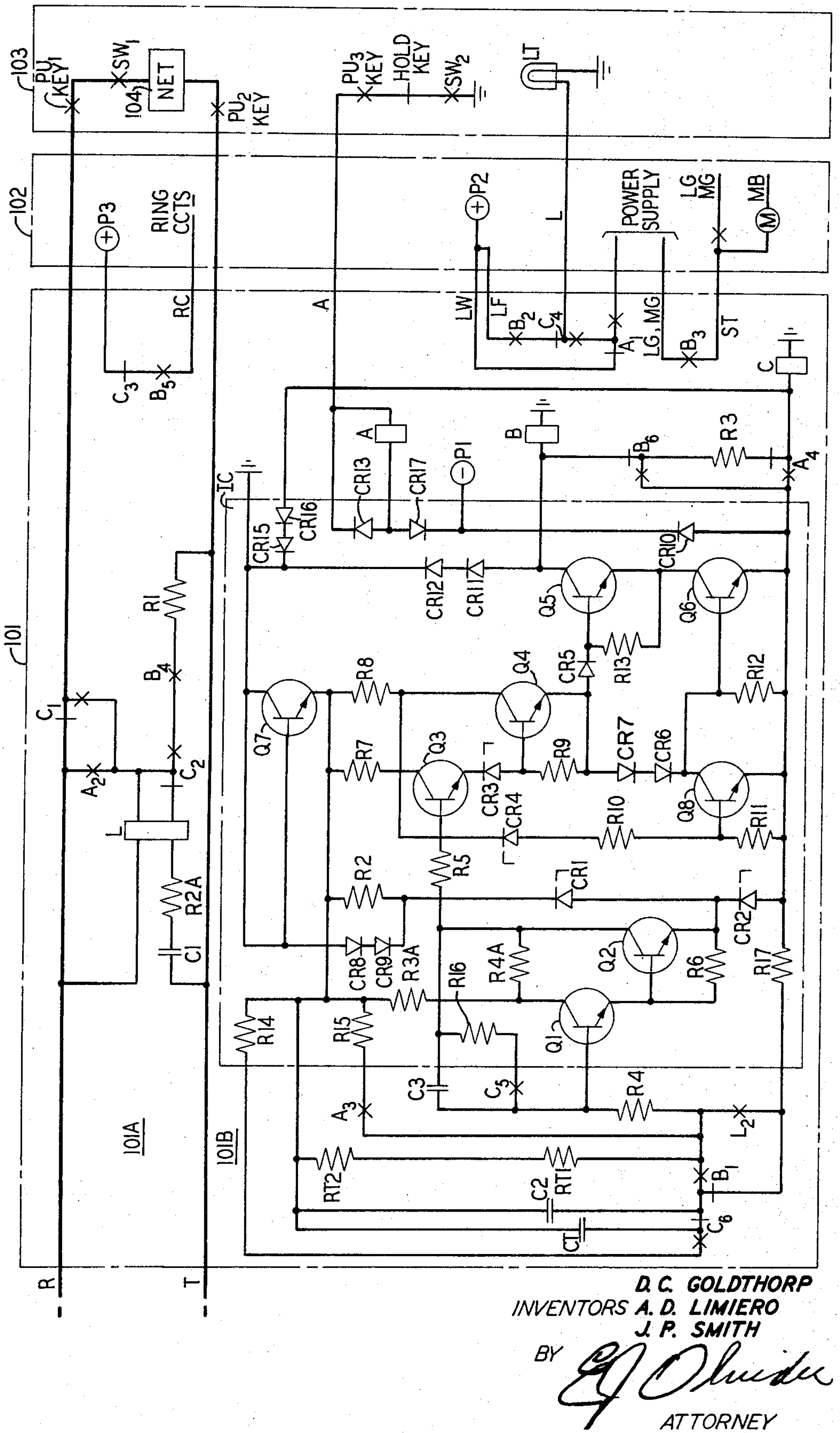
D. C. GOLDTHORP
INVENTORS A. D. LIMIERO
J. P. SMITH
BY [signature]
ATTORNEY

LINE CIRCUIT FOR A KEY TELEPHONE SYSTEM

BACKGROUND OF THE INVENTION

1. Field of the Invention

This invention relates to telephone line circuits and more particularly to line circuits of the type utilized in key telephone systems.

2. Description of the Prior Art

A telephone line circuit forms an essential part of a telephone subscriber's equipment in that it provides an interface between a subscriber's telephone set proper and the corresponding central office, PBX or other switching point. The specific functions performed by a telephone line circuit involve those aspects of supervision and control that are incident to the establishment of a connection between a control switching point and one or more local subscribers's telephone sets. Such functions typically include signaling a particular subscriber's station in response to the detection of ringing current on the line. In some arrangements the ringing signal from the switching point may be utilized directly to operate a local ringer at the subscriber's station. In other arrangements the received ringing signal may be detected by the line circuit which, in turn, extends ringing current from a local source to an individual ringer or ringers. The latter arrangement may be employed, for example, in key telephone systems where there is a need for signaling a number of subsets in response to an incoming call.

In conventional circuits it is usual to provide for a ground return path from the line circuit ringing detector to the connecting central office. This path, as shown for example by R. E. Barbato and D. T. Davis in U.S. Pat. No. 3,436,488, issued Apr. 1, 1969, is established by extending a center tap from a resistive-capacitive bridge across the line to that portion of the circuit which includes a ground point and elements of the control and logic circuitry. The employment of a ringing ground return path of this type is satisfactory under favorable ground conditions but problems arise in those areas where ground impedances are high and uneven. Under such circumstances unbalanced potentials are created which may result in the detection of spurious ringing signals. Elimination of this problem is one of the objects of this invention.

A primary reason for the use of a ground return path for ringing current in the prior art is the need to protect the ringing detector circuits of individual stations in a key telephone system from being triggered falsely by dialing pulses applied to the telephone line by another one of the stations of the system that is connected only to the telephone line. Broadly, this protection is achieved by a timing circuit arrangement that is connected directly to the center tap of the ground return circuit. Although dial pulse interference is largely absorbed by this method, it has the inherent disadvantage of exposing the ringing detector circuit to other forms of interference. Avoidance of this disadvantage is another of the objects of this invention.

Another problem known to occur in prior art line circuits is that fluctuations in line circuit operating current occur with variations in loop length. Stabilization of line circuit operating current without undue cost or complexity is thus another object of the invention.

A further problem relates to the fact that prior art line circuits have not exploited the advantages of high reliability and low cost that are inherent in the use of integrated circuits. The continued use of discrete components has resulted in part from the difficulty of fabricating integrated transistors with desirable properties which also will withstand the voltages required for driving relays. An additional object of the invention, therefore, is to employ integrated circuitry in a telephone line circuit without sacrificing the otherwise desirable properties of relatively low voltage output transistors.

SUMMARY OF THE INVENTION

The foregoing objects and additional objects are achieved in accordance with the principles of the invention by a line circuit that affords complete protection against dial pulse interference and other forms of interference without being subjected to the disadvantages of a ground return path for ringing current. One of the key features of the invention involves the elimination of the conventional ground return path and the substantial isolation of the bridged ringing detector relay circuit from the elements of the detection and logic circuit. This arrangement is made possible in part by the substitution of local power for power conventionally derived from line current. As a result, the buffer or timer capacitor has one side connected to the local power source instead of to the potential interference sources of the line.

Another feature of the invention involves a unique means for limiting the current supplied to the detection and logic circuit and for stabilizing the voltage from the local current source. Both functions are performed by a single transistor which is a part of an integrated circuit which combines all the circuit elements, aside from relays, required for ringing detection and logic.

Still another feature of the invention relates to a stacking arrangement of relay-driving output transistors that provides sufficient voltage to effect relay operation without, however, exceeding the relatively low voltage limits on transistors that are otherwise uniquely suited for fabrication by integrated circuit techniques.

BRIEF DESCRIPTION OF THE DRAWING

The single FIGURE is a schematic circuit diagram of a line circuit in accordance with the invention in combination with a typical key telephone set and a connecting interface or panel circuit.

DETAILED DESCRIPTION

The line circuit 101 in the drawing includes a bridged ringing detector 101A connected across the telephone line RT, and a logic and control circuit 101B which, in accordance with the invention, is isolated from the ringing detector portion 101A.

The ringing detector 101A includes a multifunction line relay L in combination with associated relay contacts and circuit elements. The logic and control circuit 101B employs transistors Q1–Q4 and their associated circuit components to effect various logic, detection and relay control functions. Transistors Q5, Q6 and Q8 together form a separate relay drive circuit for relay B, and transistor Q7 operates as a combination current limiter and voltage control device. The specific functions of relays A, B and C of the logic control circuit 101B are best presented in terms of the operational description that is presented hereinbelow.

A panel circuit 102 provides various power and signaling connections as well as interface connections for a telephone 103. The only elements of the telephone 103 that are illustrated are the pickup key contacts $PU_1$, $PU_2$, a substation network 104, switch hook contacts $SW_1$ and $SW_2$ and a signal light LT.

It will be noted that in the bridged ringing detector 101A relay L is shunt connected and is in circuit combination with contacts from the A, B and C relays, along with resistors R1 and R2 and a capacitor C1. In accordance with the invention, there are no conducting paths which lead from either the ring or the tip side of the telephone line to the logic or control circuitry found below. This arrangement is in contrast to prior art arrangements as shown, for example, in the Barbato-Davis patent cited above. Elimination of the ringing current ground return path, in accordance with the invention, effects reduction in the number of circuit components required, with an enhancement in reliability and a reduction in cost, together with the advantages of avoiding the occasional dilution of service quality, which is typical when ground return paths are used in areas of poor grounding characteristics.

INCOMING SIGNAL

In the idle circuit condition, each of the relays A, B and C is in the unoperated state, and transistors Q3, Q4, Q5, Q6 and Q8 are off. Transistors Q1 and Q2 are held on by current supplied to the base of transistor Q1 through the resistors RT1, RT2 and R4.

Ringing voltage is applied across the line with either side of the line grounded. As indicated above, a bridged ringing detector is used which does not require a ground return circuit or path to the detecting central office of PBX. Ringing current flows through the series connected primary and secondary windings of relay L, resistor R2 and capacitor C1 causing relay L to operate on each half cycle of ringing current. The base of transistor Q1 is connected to a negative power supply P1, which may be 24 volts for example, through resistor R4, relay contact $L_1$, resistor R17 and diode CR10. By the action of capacitor C3, however, transistor Q1 is delayed from turning off for some preselected period such as 150 milliseconds.

When transistors Q1 and Q2 do turn off, the collector voltage of transistor Q2 rises. This voltage change applied to the base of transistor Q3 by way of resistor R5 turns transistor Q3 on, and the voltage change effected thereby at the emitter of transistor Q3 causes the breakdown of diode CR3 which effects the turnon of transistors Q4, Q5 and Q6. The combined output across transistors Q5 and Q6 is employed, in accordance with the invention, in order to operate relay B. During the turnoff process, the base-emitter voltage of transistors Q5 and Q6 is pulled to zero through the resistors R13 and R12. The collector of transistor Q6 thus rises in potential to approximately one-half the supply voltage of power supply P1 and the emitter and base of transistor Q5, in effect, float up to the collector potential of transistor Q6. This floating-up of potential at the base-emitter of transistor Q5 is made possible primarily by the action of diode CR5.

Ignoring for the moment the function played by transistor Q8, the stacked arrangement of transistors Q5 and Q6 permits turning off inductive loads (such as a relay for example) with a supply voltage equal to the sum of their collector-emitter breakdown voltages, assuming open base electrodes (BVCEO), which in one embodiment of the invention is 30 volts. With transistor Q8 in the circuit, however, the effect is that of utilizing the collector-emitter breakdown characteristic of transistor Q6 with its base shorted (BVCES) rather than open. Transistor Q8 is in a saturated state when transistors Q5 and Q6 turn off and as a result of the combination of BVCES of transistor Q6 with the BVCEO of transistor Q5, the circuit in the embodiment indicated is capable of switching inductive loads up to 45 volts rather than 30 volts.

In accordance with the invention, diodes CR5, CR6 and CR7 together with transistors Q5 and Q6 are, in a sense, employed as a form of feedback circuit so that current applied to the CR5-CR6 junction point is split in such a way that transistor Q6 is turned on to the point where the collector voltage is approximately the same as the Base Voltage of Q6. The other portion of the current is applied to the base of transistor Q5 by way of diode CR5.

The particular stacking arrangement in which transistors Q5 and Q6 are connected was selected in accordance with the invention to ensure the circuit capability of energizing and deenergizing relay B without exceeding the voltage limitations of these transistors. These limitations are imposed primarily by integrated circuit parameters since all elements shown within the block IC are combined in a single integrated circuit.

The base-emitter junction of transistor Q5 has about the same drop as diode CR7 so that the collector of transistor Q6 reaches the base potential of transistor Q6 in the on state. In the off state the common node of diodes CR5 and CR6 is, in effect, open circuited.

Relay C does not operate at the same time as relay B inasmuch as a resistor R3 limits the current through its winding to less than its operating value. Relay B operated connects ground to the ST lead by way of make contact $B_3$ and connects the L lead to the LF lead by way of contact $B_2$ to initiate flashing lamp signals and interrupted ringing current. The RC lead is connected to ringing circuits (not shown) through contact $B_5$ for audible signal control. Transistors Q1 and Q2 remain off, and transistors Q3, Q4, Q5 and Q6 remain on until the call is answered or the circuit times out.

TIME-OUT OF RINGUP CIRCUIT

When relay B operates, the negative end of a charged capacitor CT is connected through contact $B_1$ to the resistor RT1 and through resistor R4 to the base of transistor Q1, holding transistor Q1 off. During the interval that ringing is not present, capacitor CT discharges to ground through resistors RT1 and RT2, driving the base of transistor Q1 in a direction to turn transistor Q1 on. If the L relay operates again before transistor Q1 turns on, capacitor CT charges again through the closed $B_1$ contact, the $L_2$ contact and resistor R17. If the L relay does not operate again, capacitor CT discharges to a point sufficient to turn on transistor Q1. The time it takes capacitor CT to discharge may be on the order of twenty seconds.

A shorter time-out period may be provided in a manner similar to that described above, with the exception that resistor RT2 may be short circuited with an optional connection, not shown, thereby lowering the resistance through which capacitor CT discharges. The time-out period can be reduced still further by shunting the RT1 resistor with an optional connection, not shown. Adding resistance across resistor RT1 also reduces delayed hold release time which is controlled by capacitor C2.

ANSWERING AN INCOMING CALL — BUSY STATE

An incoming call is answered by operating the pickup key associated with the line being rung and going off-hook. The station shunt is then connected across the line through the switch hook contacts $SW_1$ and key contacts $PU_1$ and $PU_2$, and ringing is tripped at the central office. Ground is also connected through the switch hook contacts $SW_2$ and the pickup key contacts $PU_3$ to the A lead, causing relay A to operate. Relay A operated shunts the primary or upper terminals of relay L by way of the contact $A_2$ thus preventing relay L from operating on dc line current. The base of transistor Q1 is connected to the common side of the voltage regulator through resistor R4 make contact $A_3$, and resistor R15. Additionally, the power supply P1 is connected by way of the diode CR10 and contact $A_4$ to the winding of relay C, causing it to operate. Relay C operated removes capacitor C3 from the base of transistor Q1 and connects resistor R16 by way of contacts $C_5$ across capacitor C3, causing it to discharge. Relay C operated also disconnects the negative end of capacitor CT by the operation of contacts $C_6$ and connects resistor R14 across capacitor CT, causing it to discharge and opens the RC lead at contact $C_3$ in order to discontinue local audible signaling. Owing to the base current through resistors R15 and R4, transistor Q1 turns on immediately, causing transistors Q3, Q4, Q5 and Q6 to turn off, thus releasing relay B. Relay C by way of contact $C_2$ also disconnects the ringup bridge from the line to remove the shunting impedance of resistor R2 and capacitor C1 from the transmission circuit. Relays A and C operated maintain a talking path by way of contacts $A_2$ and $C_1$ and through contacts $C_4$ and $A_1$ connect the L lead to the power supply P3 which may be on the order of plus or minus ten volts.

The procedure for making an outgoing call is the same as that for answering an incoming call, except that the transistors Q3, Q4, Q5 and Q6 are normally off and relay B is unoperated.

HOLDING

A busy line can be placed on hold by operating the hold key on telephone set 103. When the hold key is depressed, ground is disconnected from the A lead causing relay A to release.

Relay A opens the base current path established when the relay is operated as described above; the base current path through resistors RT1 and R4 maintains transistor Q1 in the on state. The $A_2$ contact that is shunting the L relay primary opens and, since the station shunt has not yet been disconnected from the line, the L relay operates on line current in series with the station shunt. Operation of contacts $L_2$ causes the base current of transistor Q1 to be connected through resistor R4 and diode CR10 to the power supply P1. The voltage at the base of transistor Q1 drops below the threshold voltage, transistors Q1 and Q2 turn off, and transistors Q3, Q4, Q5 and Q6 turn on. Transistors Q5 and Q6 will have turned on approximately 0.5 milliseconds after relay A releases, and a hold path is momentarily provided for relay C through resistor R3, break contact $B_6$, transistors Q5 and Q6 and diode CR10, and thence to power supply P1. Finally, relay B operates through transistors Q5 and Q6. Relay B operated transfers resistor R3 to diode CR10 to provide hold current for relay C. Relays B and C operated connect resistor R1 in series with the primary of relay L across the line RT to provide a holding path for the central office, to connect the LG lead to the ST lead through make contact $B_3$ and to connect the L lead to the LW lead by way of make contact $C_4$. When the hold key is released, the station shunt is disconnected from the line. Line current through the primary winding of relay L and resistor R1 maintains the circuit in the hold state.

RELEASE OF THE HOLDING BRIDGE

Any station of the key telephone system that seizes the line by operating the associated pickup key and going off-hook will cause the A relay to operate and to shunt the primary winding of the L relay which thereby releases. Relay A operated provides current through resistor R15 by way of make contact $A_3$ to turn on transistors Q1 and Q2 immediately. Transistors Q3, Q4, Q5 and Q6 turn off, releasing relay B. Relay C is held by operation of the $A_4$ make contacts, and the circuit is thus returned to a busy state.

When in the hold state, the circuit will bridge line current open for some preselected period. The circuit will not release from the hold state, however, when the line current is reversed. The duration of an absence of line current that is required to release the circuit from the hold state may be selected through various wiring options, not shown. Interruption of the line current causes relay L to release. When relay L releases, the negative end of charged capacitor C2 is connected to resistor RT1 and through resistor R4 to the base of transistor Q1, holding Q1 off. During the line current open interval, capacitor C2 discharges to ground through resistors RT1 and RT2, driving the base of transistor Q1 in the direction to turn it on. If the L relay operates before transistor Q1 turns on, capacitors C2 and C4 recharge, and the circuit remains in the hold state. If transistors Q1 and Q2 turn on before the L relay operates, transistors Q3, Q4, Q5 and Q6 turn off and relay B releases. Relay B releasing, restores the circuit to its idle state.

DISCONNECTION

When all stations go on-hook, the A lead is disconnected from ground, causing relay A to release. Release of relay A opens the holding path for relay C which, in turn, releases. In this way the circuit is restored to its idle state.

OPERATION WITH LOCAL POWER FAILURE

As indicated above, a local power supply P1 is employed in lieu of the alternative practice, also conventional, that calls for deriving all power from the line. In accordance with the invention, transistor Q7, connected in emitter-follower configuration, operates as a combined current limiter and constant voltage supply. The constant voltage at the emitter of transistor Q7 is, in the embodiment shown, maintained at approximately 17 volts which biases all of the internal circuitry Q1 through Q4. The emitter of transistor Q7 is extremely stable which ensures accurate time constants.

During periods when the local dc supply is non-operative, it is still possible to originate outgoing calls. When the station goes off-hook, connection to the line is direct. The primary and secondary windings of the L relay are connected in series with resistor R2 and capacitor C1 across the line, but this path has a negligible effect on the talk circuit. Incoming calls are signaled by line ringers in the usual way, although visual and common audible signals are inoperative.

It is to be understood that the embodiment described herein is merely illustrative of the principles of the invention. Various modifications thereto may be effected by persons skilled in the art without departing from the spirit and scope of the invention.

What is claimed is:

1. A telephone line circuit for a key telephone system comprising, in combination,
  - a pair of line conductors, ringing detector means bridged across said conductors,
  - a transistor network responsive to said detector means for initiating the operation of local ringing means,
  - means including a timing circuit capacitor for protecting said network against operation by spurious signals thereby eliminating the need for a ringing ground return path,
  - said transistor network being isolated from said ringing detector means,
  - a plurality of relays for performing logic and output functions,
  - said network including an interconnected pair of output transistors for driving one of said relays,
  - one of said pair having the emitter electrode thereof connected directly to the collector electrode of the other of said pair
  - and means connecting the collector electrode of said one of said pair to said last named relay.

2. Apparatus in accordance with claim 1 including means for ensuring the availability of the combination of the BVCES of said other of said pair and the BVCEO of said one of said pair for driving said last named relay.

3. Apparatus in accordance with claim 2 wherein said ensuring means includes a junction point from which operating current is applied to the base electrodes of said pair,
  - means including a first diode connecting said point to the base of said one of said pair,
  - means including second and third diodes connecting said point to the base electrode of the other of said pair,
  - a third transistor having the collector-emitter path thereof in parallel with the base-emitter path of said other of said pair
  - and means directly connecting the collector electrode of said third transistor to the base electrode of said other of said pair.

4. Apparatus in accordance with claim 3 including a local power source for biasing the transistor of said network and for operating said relays,
  - and dual function means comprising a single transistor connected in common emitter configuration between said source and said network for operating as a current limiter and voltage stabilizer.

5. Apparatus in accordance with claim 4 wherein all the transistors of said network including said pair and said single transistor are included in a single integrated circuit.

6. A telephone line circuit for a key telephone system comprising, in combination, a pair of conductors connectable to a telephone line, a bridged ringing detector including a ringing-responsive relay connected across said pair of conductors, means including a transistor network, a timing circuit and a plurality of relays responsive within preselected parameters to the operation of said ringing-responsive relay for effecting operation of said plurality of relays thereby to initiate local signaling response, said bridged ringing detector being isolated from said means with the exception of contacts of said ringing-detector relay being included as a part of said timing circuit, said said network including first and second interconnected transistors arranged as a relay driving circuit for one of said plurality of relays, the emitter electrode of said first transistor being connected to the collector electrode of said second transistor, the collector electrode of said first transistor being connected to said last named relay and means for ensuring the availability of the combination of the BVCEO of said first transistor and the BVCES of said second transistor for driving said one relay.

7. Apparatus in accordance with claim 6 wherein said ensuring means comprises a third transistor having the collector-emitter path thereof connected across the base emitter path of said second transistor, said third transistor being in a saturated state when said one relay is to be operated.

* * * * *

UNITED STATES PATENT OFFICE
CERTIFICATE OF CORRECTION

Patent No. 3,676,608 Dated July 11, 1972

Inventor(s) David C. Goldthorp, Albert D. Limiero, John P. Smith

It is certified that error appears in the above-identified patent and that said Letters Patent are hereby corrected as shown below:

On the title page under the heading "Inventors" Mr. Limiero's name should be corrected from "Limifro" to --Limiero--.

Col. 3, line 11, before "PBX" change "of" to --or--.

Col. 6, line 75, after "said" cancel "said".

Signed and sealed this 12th day of December 1972.

(SEAL)
Attest:

EDWARD M.FLETCHER,JR.
Attesting Officer

ROBERT GOTTSCHALK
Commissioner of Patents

FORM PO-1050 (10-69)

USCOMM-DC 60376-P69
☆ U.S. GOVERNMENT PRINTING OFFICE : 1969 O—366-334